(12) United States Patent
Wilke et al.

(10) Patent No.: US 7,491,759 B2
(45) Date of Patent: Feb. 17, 2009

(54) THERMALLY HARDENABLE SINGLE COMPONENT COATING MATERIALS, METHOD FOR PRODUCTION AND USE THEREOF

(75) Inventors: Guido Wilke, Münster (DE); Helmut Kleine-Beckmann, Ostbevern (DE); Andreas Hanning, Dülmen (DE)

(73) Assignee: BASF Coatings AG, Munster (DE)

( * ) Notice: Subject to any disclaimer, the term of this patent is extended or adjusted under 35 U.S.C. 154(b) by 440 days.

(21) Appl. No.: 10/555,521

(22) PCT Filed: Apr. 29, 2004

(86) PCT No.: PCT/EP2004/004551

§ 371 (c)(1), (2), (4) Date: Nov. 2, 2005

(87) PCT Pub. No.: WO2004/101175

PCT Pub. Date: Nov. 25, 2004

(65) Prior Publication Data

US 2006/0241219 A1      Oct. 26, 2006

(30) Foreign Application Priority Data

May 19, 2003   (DE)   ................................. 103 22 432

(51) Int. Cl.
*C08K 5/3492*      (2006.01)
(52) U.S. Cl. .................................................... 524/100
(58) Field of Classification Search ................... 524/100
See application file for complete search history.

(56) References Cited

U.S. PATENT DOCUMENTS

| | | | |
|---|---|---|---|
| 5,187,199 A | 2/1993 | Sudo | ........................... 523/523 |
| 5,965,670 A | 10/1999 | Mauer | ........................ 525/398 |
| 6,309,710 B1 * | 10/2001 | Sapper | ..................... 427/407.1 |
| 2003/0114578 A1 * | 6/2003 | Wamprecht et al. | ......... 524/507 |
| 2003/0171488 A1 | 9/2003 | König et al. | ................ 524/589 |

FOREIGN PATENT DOCUMENTS

| | | |
|---|---|---|
| DE | 199 08 627 | 6/2001 |
| EP | 1 042 402 | 12/1998 |
| WO | WO 9634905 A * | 11/1996 |
| WO | WO 01/85823 | 11/2001 |

\* cited by examiner

*Primary Examiner*—Kriellion A Sanders
(74) *Attorney, Agent, or Firm*—Cantor Colburn LLP

(57) ABSTRACT

Thermally curable one-component coating materials having a solids content of from 40 to 80% by weight and an electrical resistance in the range from 600 to 1300 kΩ, and process for preparing them, and their use.

22 Claims, No Drawings

THERMALLY HARDENABLE SINGLE COMPONENT COATING MATERIALS, METHOD FOR PRODUCTION AND USE THEREOF

CROSS REFERENCE TO RELATED APPLICATION

This application is based on PCT/EP2004/004551 filed on 29 Apr. 2004, which claims priority to DE 10322432.7, filed 19 May 2003.

BACKGROUND OF THE INVENTION

The present invention relates to new thermally curable one-component coating materials. The present invention also relates to a new process for preparing thermally curable one-component coating materials. The present invention additionally relates to the use of the new thermally curable one-component coating materials as clearcoat materials for producing clearcoats, especially clearcoats of multicoat color and/or effect paint systems.

Modern automobiles, especially top-class automobiles, have multicoat color and/or effect paint systems. These systems, as is known, comprise an electrocoat, a surfacer coat, antistonechip primer coat or functional coat, a color and/or effect basecoat, and a clearcoat. The multicoat paint systems are produced by means of what are termed wet-on-wet techniques, in which a clearcoat film is applied to a dried but not yet cured basecoat film and then at least basecoat film and the clearcoat film are conjointly thermally cured. This process may also include the production of the electrocoat and of the surfacer, antistonechip primer or functional coat.

The multicoat color and/or effect paint systems are known to possess the features of what has been termed automobile quality. According to European Patent EP 0 352 298 B1, page 15, line 42, to page 17, line 14 this means that the multicoat paint systems in question score highly for
(1) gloss,
(2) brightness,
(3) distinctiveness of image (DOI, i.e. of the reflected image),
(4) hiding power and uniformity thereof,
(5) dry film thickness uniformity,
(6) gasoline resistance,
(7) solvent resistance,
(8) acid resistance,
(9) hardness,
(10) abrasion resistance,
(11) scratch resistance,
(12) impact strength,
(13) intercoat and substrate adhesion, and
(14) weathering and UV stability.

Other important technological properties include
(15) high resistance to condensation,
(16) absence of any propensity toward blushing, and
(17) high stability toward tree resin and bird droppings.

The clearcoats in particular are marked by such essential technological properties as
(1) gloss,
(2) brightness,
(3) distinctiveness of image (DOI, i.e. of the reflected image),
(6) gasoline resistance,
(7) solvent resistance,
(8) acid resistance,
(9) hardness,
(10) abrasion resistance,
(11) scratch resistance,
(14) weathering and UV stability.
(15) high resistance to condensation,
(16) resistance to blushing and
(17) stability toward tree resin and bird droppings.

The quality of the clearcoats is therefore subject to particularly stringent requirements.

However, particular requirements are also imposed on the technological properties of the clearcoat materials from which these clearcoats are produced. To start with they must provide the clearcoats in the requisite quality without problems and with outstanding reproducibility. They must be preparable in a simple and outstandingly reproducible way.

Not least, they are also required to lend themselves to application on the line in the automobile plant using modern application methods, such as pneumatic spray painting with pneumatic hand sprayguns and automatic spray guns or electrostatic spray painting (ESTA) with manual spray guns or automatic high-speed rotating bells, with no problems being encountered in producing dry film thicknesses of 45 µm or more without the development of runs or pops.

For the economics of the finishing operation it is essential that the clearcoat materials on application have a high solids content. And yet the processing viscosity of the clearcoat materials must not exceed the limit determined by the finishing installation. For example, at a processing flow time of 25 seconds in accordance with DIN EN ISO 2431 (DIN ISO cup with 4 mm outlet nozzle) the clearcoat materials ought to have a solids content of >45% and in particular more than 50% by weight.

Another vital prerequisite for the applicability of the clearcoat materials by means of ESTA is that their electrical resistance is neither too high nor too low. The technical ideal is an electrical resistance in the range from 600 to 1300 kΩ.

Thermally curable one-component coating materials which comprise
hydroxyl-containing (meth)acrylate (co)polymers,
at least two crosslinking agents selected from the group consisting of tris(alkoxycarbonylamino)triazines, melamine-formaldehyde resins, and blocked polyisocyanates,
at least one additive, and
organic solvents
are known.

German Patent DE 697 029 927 T2 discloses clearcoat materials which comprise (meth)acrylate copolymers having secondary hydroxyl groups. The coating materials may also include (meth)acrylate copolymers having primary hydroxyl groups. Tris(alkoxycarbonylamino)triazines are used as obligatory crosslinking agents. As what are termed auxiliary crosslinker components it is possible, inter alia, to use blocked polyisocyanates (of which no further details are given), amino resins, and melamine resins. Their amounts, however, are not to exceed 20% by weight of the total amount of (meth)acrylate copolymers, tris(alkoxycarbonylamino)triazines, and auxiliary crosslinker components. The known clearcoat materials give clearcoats of high acid resistance, weathering stability, and yellowing stability; by way of the (meth)acrylate copolymers containing primary hydroxyl groups it is possible to adjust such key properties as scratch resistance, flexural strength, and impact strength.

International patent application WO 96/34905 A discloses clearcoat materials containing from 30 to 90% by weight, based on the solids of the clearcoat material, of a (meth)acrylate copolymer and of an alkylated melamine-formaldehyde resin or of a polyisocyanate and of a polymer having at least two isocyanate-reactive groups and also from 10 to 70% by weight, based on the solids of the clearcoat material, of a tris(alkoxycarbonylamino)triazine. The clearcoats produced from this material exhibit high abrasion resistance and etch resistance.

International Patent Application WO 97/47700 A discloses clearcoat materials comprising (meth)acrylate copolymers having secondary hydroxyl groups, tris(alkoxycarbonylamino)triazines, and, if desired, further crosslinking agents, such as amino resins and/or blocked polyisocyanates (of which no further details are given). The clearcoat materials feature high stability on storage and a low organic solvent content. Clearcoats produced from them exhibit high hardness, high gloss, good adhesion between basecoat and clearcoat, good topcoat holdout, good scratch resistance, good resistance to climatic influences, organic solvents and acids, and high resistance toward yellowing and blushing.

American patent U.S. Pat. No. 5,574,103 A or European Patent Application EP 0 604 922 A1 discloses clearcoat materials comprising hydroxyl-containing (meth)acrylate copolymers, tris(alkoxy)carbonylamino)triazines, and an arbitrary amino resin. The clearcoats produced from these materials have good etch resistance.

Known from European Patent EP 0 843 694 B1 are clearcoat materials which include at least two hydroxyl-containing (meth)acrylate copolymers, from 10 to 50% by weight, based on the solids, of a blocked polyisocyanate, and from 0 to 50% by weight, based on the solids, of a tris (alkoxycarbonylamino)triazine and/or of an arbitrary amino resin. Pyrazoles are included among many others in the blocking agents which can be used. 2,3-Dimethylpyrazole is mentioned by name. That derivative, however, is not a blocking agent, since it contains no isocyanate-reactive hydrogen atom. As the amino resin it is possible, besides many others, to use Cymel® 327, a water-soluble, reactive melamine-formaldehyde resin with a moderate to high degree of alkylation and a moderate to high imino functionality. The clearcoats produced from the clearcoat materials have a good topcoat holdout, good acid resistance, and good resistance to condensation exposure.

Last but not least, European Patent EP 1 042 402 B1 discloses clearcoat materials which comprise hydroxyl-containing (meth)acrylate copolymers and, based on the solids, from 20 to 35% by weight of an arbitrary amino resin and from 1 to 20% by weight of a tris(alkoxycarbonylamino)triazine. The total amount of the amino resins and of the tris(alkoxycarbonylamino)triazines is from 25 to 45% by weight of the solids. There is no provision for the use of blocked polyisocyanates. The clearcoats produced from the clearcoat materials exhibit high abrasion ("marring") resistance, good etch resistance, and a good overall visual appearance.

The known clearcoat materials have the drawback that their capacity for application and their solids content on application leave much to be desired. Furthermore, the known clearcoats frequently lose their automobile quality when the clearcoat materials from which they are produced are optimized in their capacity for application and in their solids content on application.

It is therefore an object of the present invention to find new thermally curable one-component systems which no longer have the drawbacks of the prior art.

They ought to be preparable in a particularly simple way and with outstanding reproducibility and ought to be suitable for use in particular as clearcoat materials for producing clearcoats, especially clearcoats of multicoat color and/or effect paint systems.

They ought to be able to be applied on the line at the automobile plant using modern application methods, such as pneumatic spray painting with pneumatic manual spray guns and automatic spray guns or electrostatic spray painting (ESTA) using manual spray guns or automatic high-speed rotating bells, with no problems being encountered in achieving dry film thicknesses of 45 µm or more without the development of runs or pops.

On application they ought to have a high solids content, preferably >40% by weight. Despite this their processing viscosity must not exceed the limits imposed by the finishing installation. In particular the clearcoat materials at a processing flow time of 25 seconds according to DIN EN ISO 2431 (DIN ISO cup with 4 mm outlet nozzle) ought to have a solids content of >40% and in particular more than 45% by weight.

The multicoat color and/or effect paint systems produced using the novel thermally curable one-component coating materials ought to exhibit what is termed the automobile quality. In accordance with European Patent EP 0 352 298 B1, page 15, line 42, to page 17, line 14 this means that the multicoat paint systems in question ought to score highly for
(1) gloss,
(2) brightness,
(3) distinctiveness of image (DOI, i.e. of the reflected image),
(4) hiding power and uniformity thereof,
(5) dry film thickness uniformity,
(6) gasoline resistance,
(7) solvent resistance,
(8) acid resistance,
(9) hardness,
(10) abrasion resistance,
(11) scratch resistance,
(12) impact strength,
(13) intercoat and substrate adhesion, and
(14) weathering and UV stability.

Other important technological properties include
(15) high resistance to condensation,
(16) absence of any propensity toward blushing, and
(17) high stability toward tree resin and bird droppings.

The clearcoats in particular are marked by such essential technological properties as
(1) gloss,
(2) brightness,
(3) distinctiveness of image (DOI, i.e. of the reflected image),
(6) gasoline resistance,
(7) solvent resistance,
(8) acid resistance,
(9) hardness,
(10) abrasion resistance,
(11) scratch resistance,
(14) weathering and UV stability.
(15) high resistance to condensation,
(16) resistance to blushing and
(17) stability toward tree resin and bird droppings.

SUMMARY OF THE INVENTION

The invention accordingly provides the new thermally curable one-component coating materials with a solids content of from 40 to 80% by weight and an electrical resistance in the range from 600 to 1300 kΩ which are composed of, based in each case on the coating material,
(A) from 18 to 25% by weight, calculated as solids, of at least one (meth)acrylate (co)polymer with a hydroxyl number of from 80 to 240 mg KOH/g, an acid number of from 0 to 40 mg KOH/g, a number-average molecular weight of from 1500 to 20,000 daltons, a glass transition temperature of from −40 to +80° C., and a primary hydroxyl group content >50 equivalent %, based on the total amount of hydroxyl groups present in (A), (B) from 2 to 7% by weight, calculated as solids, of at least one tris(alkoxycarbonylamino)triazine, (C) from 3 to 8% by weight, calculated as solids, of at least one polyisocyanate blocked with pyrazole and/or with at least one substituted pyrazole, (D) from 3 to 9% by weight, calculated as solids, of at least one water-soluble, reactive melamine-formaldehyde resin having a moderate to high degree of alkylation and a moderate to high imino functionality, (E) from 3 to 9% by weight, calculated as solids, of at least one water-insoluble, high-reactivity melamine-formaldehyde resin, (F) from 0 to 40% by weight, calculated as solids, of at least one additive, and (G) from 20 to 60% by weight of at least one organic solvent, and which are referred to below as "coating materials of the invention".

The invention further provides the new process for preparing the coating materials of the invention, which involves mixing constituents (A) to (G) with one another and homogenizing the resulting mixture and which is referred to below as "process of the invention".

Further subject matter of the invention will emerge from the description.

In the light of the prior art it was surprising and unforeseeable for the skilled worker that the object on which the present invention was based could be achieved by means of the coating materials of the invention and by means of the process of the invention.

Thus the coating materials of the invention no longer had the drawbacks of the prior art.

They were preparable with particular simplicity and outstanding reproducibility and could be used in particular as clearcoat materials for producing clearcoats, especially clearcoats of multicoat color and/or effect paint systems.

In the pilot plant it was possible to apply them under conditions which correspond to the realistic conditions on the line at an automobile plant by means of modern application methods, such as pneumatic spray painting with pneumatic manual spray guns and automatic spray guns or electrostatic spray painting (ESTA) using manual spray guns or automatic high-speed rotating bells, with no problems being encountered in achieving dry film thicknesses of 45 μm or more without the development of runs or pops.

On application they had high solids content, preferably >40% by weight. Despite this their processing viscosity did not exceed the limits imposed by the finishing installation. In particular, at a processing flow time of 25 seconds according to DIN EN ISO 2341 (DIN ISO cup 4 mm outlet nozzle) they had a solids content of >45% and in particular >50% by weight.

The multicoat color and/or effect paint systems produced by means of the coating materials of the invention had the so-called automobile quality. According to European Patent EP 0 352 209 B1, page 15, line 42, to page 17, line 14, this means that the multicoat paint systems in question scored highly for (1) gloss,
(2) brightness,
(3) distinctiveness of image (DOI, i.e. of the reflected image),
(4) hiding power and uniformity thereof,
(5) dry film thickness uniformity,
(6) gasoline resistance,
(7) solvent resistance,
(8) acid resistance,
(9) hardness,
(10) abrasion resistance,
(11) scratch resistance,
(12) impact strength,
(13) intercoat and substrate adhesion, and
(14) weathering and UV stability.

Other important technological properties include
(15) high resistance to condensation,
(16) absence of any propensity toward blushing, and
(17) high stability toward tree resin and bird droppings.

The clearcoats in particular are marked by such essential technological properties as
(1) gloss,
(2) brightness,
(3) distinctiveness of image (DOI, i.e. of the reflected image),
(6) gasoline resistance,
(7) solvent resistance,
(8) acid resistance,
(9) hardness,
(10) abrasion resistance,
(11) scratch resistance,
(14) weathering and UV stability.
(15) resistance to condensation,
(16) resistance to blushing and
(17) stability toward tree resin and bird droppings.

very decisively.

The coating material of the invention has a solids content of 40 to 80%, preferably from 45 to 70%, and in particular from 50 to 60% by weight and an electrical resistance in the range from 600 to 1300 and preferably from 800 to 1200 kΩ.

By "solids" here and below is meant that fraction of a coating material of the invention which constitutes the coating of the invention following application and thermal curing.

DETAILED DESCRIPTION OF THE INVENTION

The first essential constituent of the coating material of the invention is at least one, especially one (meth)acrylate (co)polymer (A), preferably a (meth)acrylate copolymer (A), and in particular a methacrylate copolymer (A). In the coating material of the invention this copolymer, calculated as solids, is present in an amount, based in each case on the coating material, of from 18 to 25% and in particular from 19 to 24% by weight. It has a hydroxyl number of from 80 to 240, preferably from 100 to 220, and in particular from 120 to 200 mg KOH/g, an acid number of from 0 to 40, preferably from 3 to 35, and in particular from 5 to 30 mg KOH/g, a number-average molecular weight of from 1500 to 20,000, preferably from 2000 to 15,000, and in particular from 2500 to 14,000 daltons, a glass transition temperature of from −40 to +80° C., preferably from −35 to +75° C., and in particular from −30 to +70° C., and a primary hydroxyl group content >50, preferably >55, and in particular >60 equivalent %, based on the total amount of hydroxyl groups % in (A).

The (meth)acrylate (co)polymers (A) contain in copolymerized form conventional hydroxyl-containing monomers (a1) and also, where appropriate, hydroxyl-free monomers (a2), but especially hydroxyl-containing monomers (a1) and hydroxyl-free monomers (a2), these monomers (a) being olefinically unsaturated.

Examples of suitable hydroxyl-containing, olefinically unsaturated monomers (a1) are the monomers (a11) to (a14).

Examples of suitable hydroxyl-containing olefinically unsaturated monomers (a11) are hydroxyalkyl esters of olefinically unsaturated carboxylic, sulfonic and phosphonic acids and acidic phosphoric and sulfuric esters, especially carboxylic acids, such as acrylic acid, beta-carboxyethyl acrylate, methacrylic acid, ethacrylic acid and crotonic acid, particularly acrylic acid and methacrylic acid.

The monomers (a11) are derived from an alkylene glycol which is esterified with the acid or are obtainable by reacting the acid with an alkylene oxide such as ethylene oxide or propylene oxide.

It is preferred to use the hydroxyalkyl esters in which the hydroxyalkyl groups contains up to 20 carbon atoms as monomers (a11), especially 2-hydroxyethyl or 3-hydroxypropyl acrylate or methacrylate; 4-hydroxybutyl (meth)acrylate; 2-alkylpropane-1,3-diol mono(meth)acrylates, such as 2-methyl-, 2-ethyl-, 2-propyl-, 2-isopropyl- or 2-n-butyl-propane-1,3-diol mono(meth)acrylate, especially 2-methyl-propane-1,3-diol mono(meth)acrylate; 1,4-bis(hydroxymethyl)cyclohexane or octahydro-4,7-methanol-1H-indenedimethanol monoacrylate or monomethacrylate; or reaction products of cyclic esters, such as epsilon-caprolactone, for example, and these hydroxyalkyl esters.

The monomers (a11) may also be derived from polyols, such as trimethylolpropane monoallyl or diallyl ether or pentaerythritol monoallyl, diallyl or triallyl ether. These higher polyfunctional monomers (a11) are generally used only in minor amounts. By minor amounts of higher polyfunctional monomers (a11) here are meant amounts which do not lead to crosslinking or gelling of the (meth)acrylate copolymers (A) unless the intention is that they should be in the form of crosslinked microgel particles.

Suitable monomers (a12) include allyl alcohol, ethoxylated and/or propoxylated allyl alcohol, which is or are sold by the company Arco Chemicals, or 2-hydroxyalkyl allyl ethers, especially 2-hydroxyethyl allyl ether. Where used they are employed preferably not as sole monomer (a1) but rather in an amount of from 0.1 to 10% by weight, based on the (meth)acrylate copolymer (A).

Examples of suitable monomers (a13) are reaction products of the aforementioned olefinically unsaturated acids, particularly acrylic acid and/or methacrylic acid, with the glycidyl ester of an alpha-branched monocarboxylic acid having 5 to 18 carbon atoms per molecule, in particular a Versatic® acid, or, instead of the reaction products, an equivalent amount of the aforementioned olefinically unsaturated acids, in particular acrylic acid and/or methacrylic acid, which then, during or after the polymerization reaction, is or are reacted with the glycidyl ester of an alpha-branched monocarboxylic acid having 5 to 18 carbon atoms per molecule, in particular a Versatic® acid (cf. Römpp Lexikon Lacke und Druckfarben, Georg Thieme Verlag, Stuttgart, N.Y., 1998, "Versatic® acids", pages 605 and 606).

Examples of suitable monomers (a14) are acryloxy silane-containing vinyl monomers, which are preparable by reacting hydroxy-functional silanes with epichlorohydrin and then reacting the reaction product (meth)acrylic acid and/or hydroxyalkyl and/or hydroxycycloalkyl esters of (meth)acrylic acid and/or further hydroxyl-containing monomers (a12) and (a13).

It is preferred to use the monomers (a11), especially those having primary hydroxyl groups.

Examples of suitable hydroxyl-free olefinically unsaturated monomers (a2) are the monomers (a21) to (a214):

monomers (a21) are monomers which carry at least one acid group per molecule, such as acrylic acid, beta-carboxyethyl acrylate, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzene sulfonic acid (all isomers).

Monomers (a22) are monomers having amine groups, such as aminoethyl acrylate, aminoethyl methacrylate, allylamine or N-methylaminoethyl acrylate.

Monomers (a23) are monomers containing N-methylene ether groups, such as N,N-di(methoxymethyl)aminoethyl acrylate or methacrylate or N,N-di(butoxymethyl)aminopropyl acrylate or methacrylate;

Monomers (a24) are monomers having amide groups, such as (meth)acrylamides, such as (meth)acrylamide, N-methyl-, n-methylol-, N,N-dimethylol-, N-methoxy-methyl-, N,N-di(methoxymethyl)-, N-ethoxymethyl- and/or N,N-di(ethoxyethyl)-(meth)acrylamide;

Monomers (a25) are monomers with carbamate groups or allophanate groups, such as acryloyloxy- or methacryloyloxyethyl, -propyl or -butyl carbamate or allophanate; further examples of suitable monomers containing carbamate groups are described in patents U.S. Pat. Nos. 3,479,328, 3,674,838, 4,126,747, 4,279,833 or 4,340,497.

Monomers (a26) are monomers with epoxide groups, such as the glycidyl ester of acrylic acid, methacrylic acid, ethacrylic acid, crotonic acid, maleic acid, fumaric acid or itaconic acid, or allyl glycidyl ether.

Monomers (a27) are (meth)acrylic esters that are free or substantially free of reactive functional groups, such as (meth)acrylic alkyl or cycloalkyl esters having up to 20 carbon atoms in the alkyl radical, especially methyl, ethyl, n-propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methanol-1H-indenemethanol or tert-butylcyclohexyl (meth)acrylate; (meth)acrylic oxaalkyl or oxacycloalkyl esters such as ethoxytriglycol (meth)acrylate and methoxyoligoglycol (meth)acrylate having a molecular weight Mn of preferably 550 or other ethoxylated and/or propoxylated, hydroxyl-free (meth)acrylic acid derivatives (further examples of suitable monomers (a27) of this kind are known from laid-open patent application document DE 196 25 773 A1, column 3, line 65, to column 4, line 20). These monomers may contain minor amounts of higher polyfunctional (meth)acrylic alkyl or cycloalkyl esters such as ethylene glycol, propylene glycol, diethylene glycol, dipropylene glycol, butylene glycol, pentane-1,5-diol, hexane-1,6-diol, octahydro-4,7-methanol-1H-indenedimethanol or cyclohexane-1,2-, -1,3- or -1,4-diol di(meth)acrylate; trimethylolpropane tri(meth)acrylate; or pentaerythritol tetra(meth)acrylate. By minor amounts of higher polyfunctional monomers (a27) here are meant amounts which do not lead to crosslinking or gelling of the copolymers, unless the intention is that they should be in the form of crosslinked microgel particles.

Monomers (a28) are vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins can be products from the cracking of paraffinic hydrocarbons, such as mineral oil fractions, and can contain both branched and linear acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. The vinyl esters may alternatively be prepared in a conventional manner from the acids, for example, by reacting the acid with acetylene. Particular preference, owing to their ready availability, is given to using vinyl esters of saturated aliphatic monocarboxylic acids having 9 to 11 carbon atoms that are branched on the alpha carbon atom. Vinyl esters of this kind are sold under the brand name Veova® (cf. also Römpp Lexikon Lacke und Druckfarben, Georg Thieme Verlag, Stuttgart, N.Y., 1998, page 598).

Monomers (a29) are diarylethylenes, particularly those of the general formula I:

$$R^1R^2C=CR^3R^4 \quad (I),$$

in which the radicals $R^1$, $R^2$, $R^3$ and $R^4$ each independently of one another stand for hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ stand for substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diyl-cyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkylaryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphenyl-1-yl. Examples of suitable arylcycloalkyl radicals are 2-, 3- or 4-cyclohexylphenyl-1-yl. The aryl radicals $R^1$, $R^2$, $R^3$ and/or $R^4$ are preferably phenyl or naphthyl radicals, especially phenyl radicals. The substituents present where appropriate in the radicals $R^1$, $R^2$, $R^3$ and/or $R^4$ are electron-withdrawing or electron-donating atoms or organic radicals, especially halogen atoms, nitriles, nitro, partly or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy, and cycloalkyloxy radicals; and/or arylthio, alkylthio and cycloalkylthio radicals. Particular advantage is possessed by diphenylethylene, dinaphthaleneethylene, cis- or trans-stilbene or vinylidene-bis(4-nitrobenzene), especially diphenylethylene (DPE), and so these are used with preference.

Monomers (a210) are vinylaromatic hydrocarbons such as styrene, vinyltoluene or alpha-alkyl styrenes, such as alpha-methyl styrene.

Monomers (a211) are nitriles such as acrylonitrile and/or methacrylonitrile.

Monomers (a212) are vinyl compounds, especially vinyl halides and/or vinylidenedihalides such as vinyl chloride, vinyl fluoride, vinylidene dichloride or vinylidene difluoride; N-vinyl amides such as vinyl-N-methylformamide, N-vinyl-caprolactam or N-vinylpyrrolidone; 1-vinylimidazole, vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a213) are allyl compounds, such as allyl ethers and allyl esters, especially allyl methyl, ethyl, propyl or butyl ether or allyl acetate, propionate or butyrate.

Monomers (a214) are polysiloxane macromonomers which have a number-average molecular weight Mn of from 1000 to 40,000 and contain on average from 0.5 to 2.5 ethylenically unsaturated double bonds per molecule; especially polysiloxane macromonomers which have a number-average molecular weight Mn of from 2000 to 20,000, more preferably from 2500 to 10,000, and in particular from 3000 to 7000 and which contain on average from 0.5 to 2.5, preferably from 0.5 to 1.5, ethylenically unsaturated double bonds per molecule, as described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in International Patent Application WO 92/22615 on page 12, line 18 to page 18, line 10.

The monomers (a1) and, where appropriate (a2) are selected so as to give the hydroxyl numbers, acid numbers, primary hydroxyl group contents, and glass transition temperatures indicated above.

The selection of the monomers (a) for adjusting the glass transition temperatures can be undertaken by the skilled worker with the assistance of the following formula of Fox, which can be used to calculate, approximately, the glass transition temperatures of poly(meth)acrylates;

n=x

n=1

Tg=glass transition temperature of the poly(meth)acrylate;
$W_n$=weight fraction of the nth monomer;
$TG_n$=glass transition temperature of the homopolymer of nth monomer; and
x=number of different monomers.

The preparation of the (meth)acrylate copolymers (A) for use in accordance with the invention has no special features in terms of process but instead takes place by means of the methods, familiar in the plastics field, of continuous or batchwise free-radically initiated copolymerization in bulk, solution, emulsion, mini emulsion or microemulsion under atmospheric or superatmospheric pressure in stirred tanks, autoclaves, tube reactors, loop reactors or Taylor reactors at temperatures of preferably from 50 to 200° C.

Examples of suitable copolymerization techniques are described in Patent Applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 or WO 98/02466. Alternatively the copolymerization can be carried out in polyols as reaction medium, as described for example in German Patent Application DE 198 50 243 A1.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butylper-3,5,5-trimethylhexanoate or tert-butyl per-2-ethylhexanoate; peroxodicarbonates; potassium, sodium or ammonium peroxodisulfate; azo initiators, examples being azo dinitriles such as azobisiso-butyronitrile; C—C-cleaving initiators such as benzpinacol silyl ethers; or a combination of a nonoxidizing initiator with hydrogen peroxide. It is also possible to employ combinations of the initiators described above.

Other examples of suitable initiators are described in German Patent Application DE 196 28 142 A1, page 3, line 49 to page 4, line 6.

It is preferred to add comparatively large amounts of free-radical initiator, with the fraction of the initiator as a proportion of the reaction mixture, based in each case on the total amount of the monomers (A) and of the initiator, being with particular preference from 0.2 to 20% by weight, with very particular preference form 0.5 to 15% by weight, and in particular from 1.0 to 10% by weight.

A further possibility is to use thiocarbonylthio compounds or mercaptans such as dodecyl mercaptan as chain transfer agents or molecular weight regulators.

The second essential constituent of the coating material of the invention is at least one, especially one, tris(alkoxycarbonylamino)triazine (B). In the coating material of the invention, calculated as solids, it is present in an amount of from 2 to 7% and in particular from 2 to 6% by weight, based in each case on the coating material. Highly suitable tris(alkoxycarbonylamino)triazines (B) have the following formula:

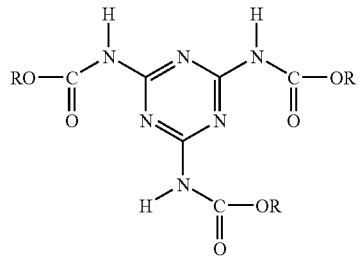

Examples of suitable tris(alkoxycarbonylamino)triazines are described in patents U.S. Pat. No. 4,939,213 A1 or U.S. Pat. No. 5,084,541 A1 or in European Patent Application EP 0 624 577 A1. Use is made in particular of the tris(methoxy-, tris(butoxy- and/or tris(2-ethylhexoxycarbonylamino)triazines. Of advantage are the methyl butyl mixed esters, the butyl 2-ethylhexyl mixed esters, and the butyl ester.

The third essential constituent of the coating material of the invention is at least one, especially one, polyisocyanate (C) blocked with pyrazole and/or with at least one, especially one, substituted pyrazole. Preference is given to using a polyisocyanate (C) blocked with a substituted pyrazole. In the coating material of the invention, calculated as solids, it is present in an amount of from 2 to 8 and in particular from 2 to 5% by weight, based on the coating material.

The substituted pyrazole is preferably selected from the group consisting of pyrazoles monosubstituted in position 3, disubstituted in the 3, 4 or 3,5 position or trisubstituted in the 3,4,5 position, especially pyrazoles disubstituted in 3, 4 or 3,5 position. Examples of suitable substituted pyrazoles are known from European Patent EP 0 159 117 B1. The 3,4- or 3,5-disubstituted pyrazole is preferably selected from the group of the alkyl-substituted, especially methyl-substituted, pyrazoles. Particular preference is given to using 3,5-dimethylpyrazole.

Diisocyanates and polyisocyanates for blocking suitably include virtually all conventional aromatic, aliphatic, and cycloaliphatic diisocyanates and polyisocyanates. Of particular suitability are those diisocyanates and polyisocyanates which those in the art refer to as paint polyisocyanates.

Examples of suitable aromatic diisocyanates for blocking are tolylene diisocyanate, xylylene diisocyanate, bisphenylene diisocyanate, naphthylene diisocyanate or diphenylmethane diisocyanate.

Examples of suitable acyclic aliphatic diisocyanates for blocking are trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, 4-isocyanataomethyl-1,8-octamethylene diisocyanate, or diisocyanates derived from dimer fatty acids, as sold under the tradename DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane.

Examples of suitable cycloaliphatic diisocyanates are isophorone diisocyanate (i.e., 5-isocyanato-1-isocyanatomethyl-1,3,3-trimethylcyclohexane), 5-isocyanato-1-(2-isocyanatoethy-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanataocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate.

Examples of suitable polyisocyanates for blocking are polyurethane prepolymers which contain isocyanate groups, which can be prepared by reacting polyols with an excess of the above-described aromatic, aliphatic, and cycloaliphatic, preferably aliphatic and cycloaliphatic diisocyanates and are preferably of low viscosity. For the purposes of the present invention the term "cycloaliphatic diisocyanate" refers to a diisocyanate in which at least one isocyanate group is attached to a cycloaliphatic radical.

It is also possible to use polyisocyanates containing isocyanurate, biuret, allophanate, iminooxadiazinedione, urethane, urea, carbodiimide and/or uretdione groups, which are prepared conventionally from the diisocyanates described above. Examples of suitable preparation processes and polyisocyanates are known, for example, from patents and patent applications CA 2,163,591 A1, U.S. Pat. No. 4,419,513 A1, U.S. Pat. No. 4,454,317 A1, EP 0 646 608 A1, U.S. Pat. No. 4,801,675 A1, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 or EP 0 531 820 A1.

In particular, hexamethylene diisocyanate is used.

The fourth essential constituent of the coating material of the invention is at least one, especially one, water-soluble, reactive melamine-formaldehyde resin (D) which has a moderate to high degree of alkylation and a moderate to high imino functionality. In the coating material of the invention, calculated as solids, it is present in an amount of from 3 to 9% and in particular from 3 to 8% by weight, based in each case on the coating material.

"Reactive" means that the melamine-formaldehyde resin (D), during thermal crosslinking, must normally be catalyzed with weak organic and/or inorganic acids. By weak acids are meant acids having a $pK_a > 4$, especially >5. Examples of suitable weak acids are carboxylic acids, which may also have been blocked with amines and may be released only in the course of the thermal curing. The carboxyl groups present in the (meth)acrylate copolymers (A) may also act catalytically.

A moderate degree of alkylation means that on average up to 70, preferably up to 65, and in particular up to 60 mol % of the methylol groups present have been etherified. A high degree of alkylation means that at least 70 mol %, in particular at least 80 mol %, and especially substantially all, or all, of the methylol groups have been etherified. The ether groups in this case can be methyl, propyl, isopropyl, n-butyl or isobutyl groups, especially methyl groups.

A moderate to high imino functionality means that the melamine-formaldehyde resin (D) contains on average more than 0.5, in particular more than 0.7, and in particular more than 0.9 imino groups in the molecule.

The melamine-formaldehyde resins (D) are commercially customary products. Thus, for example, the company Cytec Specialty Resins A.S. sells a melamine-formaldehyde resin (D) under the brand name Cymel® 327.

The fifth essential constituent of the coating material of the invention is at least one, especially one, water-insoluble, high-reactivity melamine-formaldehyde resin (E). In the coating material of the invention, calculated as solids, it is present in an amount of from 3 to 9% and in particular from 3 to 8% by weight, based in each case on the coating material.

"High-reactivity" means that the melamine-formaldehyde resin (E) taken by itself requires no acids as catalysts of the thermal crosslinking.

The reactive melamine-formaldehyde resin (E) is preferably alkylated with alkyl groups, especially n-butyl groups.

The melamine-formaldehyde resins (E) are commercially customary products.

Thus, for example, the company BASF Aktiengsellschaft sells a melamine-formaldehyde resin (E) under the brand name Luwipal® 018.

The coating material of the invention, based in each case on the coating material, can contain up to 40%, preferably from 5 to 35%, and in particular from 5 to 30% by weight of at least one, especially one, conventional additive (F), calculated as solids.

The additive (F) is preferably selected from the group consisting of thermally curable reactive diluents; molecularly dispersely soluble dyes; light stabilizers; antioxidants; wetting agents; emulsifiers; anticrater additives; slip additives; thermal crosslinking catalysts; thermolabile free-radical initiators; adhesion promoters; leveling agents; film-forming auxiliaries; rheological assistants; flame retardants; waxes; biocides and flatting agents, organic and inorganic, transparent pigments, fillers and nanoparticles, especially light stabilizers, thermal crosslinking catalysts, wetting agents, anticrater additives, rheological assistants, and transparent inorganic nanoparticles. The profile of performance properties may be optmized further in particular through the inclusion of thermal crosslinking catalysts.

The coating material of the invention includes not least at least one organic solvent and preferably at least two, and in particular at least three, organic solvents (G) in an amount, based in each case on the coating material, of from 20 to 60%, preferably from 30 to 55%, and in particular from 40 to 50% by weight. The skilled worker is able to select suitable solvents with ease on the basis of their known solvency. Examples of suitable solvents are known from D. Stoye and W. Freitag (Editors), "Paints, Coatings and Solvents", Second, Completely Revised Edition, Wiley-VCH, Weinheim, N.Y., 1998, "14.9. Solvent Groups", pages 327 to 373.

The coating materials of the invention are preferably prepared with the aid of the process of the invention. For that purpose the above-described constituents (A) to (G) are mixed with one another and then the resulting mixture is homogenized. The constituents (A) to (G) are used in amounts so as to give the proportions described above. For mixing it is possible to use the customary and known mixing equipment, such as stirred tanks, agitator mills, extruders, compounders, Ultraturrax, in-line dissolvers, static mixers, micromixers, toothed-wheel dispersers, pressure release nozzles and/or microfluidizers.

The coating materials of the invention serve to produce the paint systems and coatings of the invention on primed or unprimed substrates. They are also suitable for all applications described in International Patent Application WO 99/52964, page 12, line 10 to page 14, line 4, especially for producing optical moldings and self-supporting films.

Suitable substrates include all surfaces to be coated that are not damaged by curing of the coating systems present thereon using heat. Suitable substrates consist, for example, of metals, plastics, wood, ceramic, stone, textile, fiber composites, leather, glass, glass fibers, glass wool, rock wool, mineral-bound and resin-bound building materials, such as plasterboard and cement slabs or roofing shingles, and also composites of these materials. The surfaces of these materials may already have been coated or painted beforehand.

The coating materials of the invention are accordingly suitable in particular for the coating, especially painting, of means of transport, including aircraft, watercraft, rail vehicles, vehicles operated by muscle power, and motor vehicles, especially automobiles, and parts thereof, the interior and exterior of constructions, doors, windows and furniture, and also, in the context of industrial coating, for the coating or painting of plastics parts, especially transparent plastics parts, small parts, coils, freight containers, packaging, mechanical, optical, and electrical components and white goods, and also for the coating of hollow glassware.

In the case of electrically conductive substrates it is possible to use primers, which are produced conventionally from electrocoat materials. Both anodic and cathodic electrocoat materials are suitable for these purposes, but especially cathodic electrocoat materials.

The coating of the invention can also be used to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations to DIN 7728T1) and also their polymer blends or the fiber-reinforced composite materials produced using these plastics.

Unfunctionalized and/or apolar substrate surfaces can be subjected prior to coating in a known manner to a pretreatment, such as with a plasma or by flaming, or provided with a hydroprimer.

Particular advantages are displayed with the coating materials of the invention and the coatings of the invention in automotive OEM finishing and refinish as clearcoats of the highest automobile quality, particularly as part of multicoat color and/or effect paint systems.

The multicoat paint systems of the invention can be produced in a variety of ways in accordance with the invention.

A first preferred version of the painting process of the invention comprises the steps of:

(I) producing a basecoat film by applying an aqueous basecoat material to the substrate, (II) drying the basecoat film, (III) producing a clearcoat film by applying the clearcoat material of the invention to the basecoat film, and (IV) jointly curing the basecoat film and the clearcoat film of the invention to give the basecoat and the clearcoat of the invention (wet-on-wet technique).

This version offers particular advantages particularly in the painting of plastics and is therefore employed with particular preference in that utility.

A second preferred version of the painting process of the invention comprises the steps of:
(I) preparing a surfacer film by applying a surfacer to the substrate,
(II) curing the surfacer film to give the surfacer coat,
(II) preparing a basecoat film by applying an aqueous basecoat material to the surfacer coat,
(IV) drying the basecoat film,
(V) preparing the clearcoat film of the invention by applying the clearcoat material of the invention to the basecoat film, and
(VI) jointly curing the basecoat film and the clearcoat film of the invention, to give the basecoat and the clearcoat of the invention (wet-on-wet technique).

A third preferred variant of the painting process of the invention comprises the steps of:
(I) preparing a surfacer film by applying a surfacer to the substrate,
(II) drying the surfacer film,
(II) preparing a basecoat film by applying an aqueous basecoat material to the surfacer film,
(IV) drying the basecoat film,
(V) preparing the clearcoat film of the invention by applying the clearcoat material of the invention to the basecoat film, and
(VI) jointly curing the surfacer film, the basecoat film, and the clearcoat film of the invention, to give the surfacer coat, the basecoat and the clearcoat of the invention (extended wet-on-wet technique).

A fourth preferred version of the painting process of the invention comprises the steps of
(I) depositing an electrocoat film on the substrate,
(II) drying the electrocoat film,
(III) preparing a first basecoat film by applying a first basecoat material to the electrocoat film,
(IV) jointly curing the electrocoat film and the first basecoat film, to give the electrocoat and the first basecoat (wet-on-wet technique),
(V) preparing a second basecoat film by applying a second basecoat material to the first basecoat,
(VI) drying the second basecoat film,
(VII) preparing the clearcoat film of the invention by applying the clearcoat material of the invention to the basecoat film, and
(VIII) jointly curing the second basecoat film and the clearcoat film of the invention, to give the second basecoat and the clearcoat of the invention (wet-on-wet technique).

The three last-mentioned versions offer particular advantages particularly in the context of the original finishing of automobile bodies and are therefore employed with very particular preference in that utility.

It is an especial advantage of the coatings produced from the clearcoat materials of the invention that they exhibit outstanding adhesion to already-cured electrocoats, surfacer coats, basecoats or conventional-clearcoats.

The coating materials of the invention can be applied by any customary application method, such as spraying, knife coating, brushing, pouring, dipping, impregnating, trickling or rolling, for example. The substrate to be coated may itself be stationary, with the application equipment or unit being in motion. Alternatively the substrate to be coated, in particular a coil, may be moving, with the application unit being stationary relative to the substrate or moving in an appropriate fashion.

It is preferred to employ spray application methods, such as compressed air spraying, airless spraying, high-speed rotation or electrostatic spray application (ESTA), for example.

The spray booth used for application may be operated, for example, with a circulation system, which may be temperature-controllable and which is operated with a suitable absorption medium for the overspray, an example of this medium being the coating materials of the invention themselves.

Generally speaking, the electrocoat film, surfacer film, basecoat film, and clearcoat film are applied in a wet film thickness such that curing thereof gives coats having the thicknesses which are advantageous and necessary for their functions. In the case of the electrocoat, this thickness is from 10 to 70, preferably from 10 to 60, more preferably from 15 to 50, and in particular from 15 to 45 µm; in the case of the surfacer coat it is from 10 to 150, preferably from 10 to 120, more preferably from 10 to 100, and in particular from 10 to 90 µm; in the case of the basecoat it is from 5 to 50, preferably from 5 to 40, more preferably from 5 to 30, and in particular from 10 to 25 µm; and in the case of the clearcoats of the invention it is from 10 to 100, preferably from 15 to 80, more preferably from 20 to 70, and in particular from 25 to 60 µm. It is, however, also possible to employ the multicoat structure known from European Patent Application EP 0 817 614 A1, comprising an electrocoat, a first basecoat, a second basecoat, and a clearcoat, in which the overall thickness of the first and second basecoats is from 15 to 40 µm and the thickness of the first basecoat amounts to from 20 to 50% of said overall coat thickness.

The surfacer film, basecoat film, and clearcoat film of the invention can be cured thermally.

Curing may take place after a certain rest period. This period may have a duration of from 30 s to 2 h, preferably from 1 min to 1 h, and in particular from 1 min to 45 min. The rest period is used, for example, for the leveling and devolatilization of the paint films or for the evaporation of volatile constituents such as solvents. The rest period may be assisted and/or shortened by the use of elevated temperatures up to 90° C. and/or by a reduced atmospheric humidity <10 g water/kg air, in particular <5 g/kg air, provided this does not involve any damage to or change in the paint films, such as premature complete crosslinking, for instance.

The thermal curing has no special features as far as its method is concerned but instead takes place in accordance with the conventional methods such as heating in a forced-air oven or irradiation with IR lamps. This thermal curing may also take place in stages. Another preferred curing method is that of curing with near infrared (NIR) radiation. Suitable methods of this kind are described, for example, by Rodger Talbert in Industrial Paint & Powder, 04/01, pages 30 to 33, "Curing in Seconds with NIR", or in Galvanotechnik, Volume 90 (11), pages 3098 to 3100, "Lackiertechnik, NIR-Trocknung im Sekundentakt von Flüssig-und Pulverlacken" [Coating technology: NIR drying in seconds of liquid and powder coatings].

The thermal curing takes place advantageously at a temperature of from 50 to 200° C., more preferably from 60 to 190° C. and in particular from 80 to 180° C. for a time of from 1 min up to 2 h, more preferably from 2 min to 1 h, and in particular from 3 min to 45 min.

The multicoat paint systems of the invention are of highest automobile quality. Accordingly the primed or unprimed substrates of the invention which have been coated with at least one coating of the invention combine a particularly advantageous profile of performance properties with a particularly long service life, so making them particularly valuable economically, aesthetically, and technically.

EXAMPLES

Examples 1 to 6 (Inventive) and Examples C1 and C2 (Comparative)

The Preparation of Clearcoat Materials 1 to 6 and Production of Clearcoats 1 to 6 (Examples 1 to 6) and of Clearcoat Materials C1 and C2 and of Clearcoats C1 and C2 (Examples C1 and C2)

The clearcoat materials 1 to 6 (examples 1 to 6) and C1 and C2 (examples C1 and C2) were prepared by mixing the constituents indicated in the table and homogenizing the resulting mixtures.

As evident from comparing the data set out in the table only clearcoat materials 1 to 6, particularly clearcoat materials 4, 5 and 6, with an application solids >50% by weight, in particular >55% by weight, possessed a resistance in the range from 600 to 1300 k$\Omega$, in particular from 920 to 980 k$\Omega$.

The clearcoats 1 to 6 (examples 1 to 6) and clearcoats C1 and C2 (examples C1 and C2) were produced by coating steel panels in succession with a cathodically deposited electrocoat baked at 170° C. for 20 minutes, in a dry film thickness of from 18 to 22 μm. Thereafter the steel panels were coated with a commercial two-component water-based surfacer from BASF Coatings AG, such as is commonly used for plastics substrates. The resultant surfacer film was baked at 90° C. for 30 minutes, to give a dry film thickness of from 35 to 40 μm. Thereafter a commercial black aqueous basecoat material from BASF Coatings AG was applied with a film thickness of 12 to 15 μm, after which the resulting aqueous basecoat films were flashed off at 80° C. for 10 minutes. Subsequently the clearcoat materials 1 to 6 and C1 and C2 were applied in one cross pass with an ESTA manual spraygun from Ransberg, giving a dry film thickness from 40 to 45 μm.

Application was carried out at a booth temperature of 23±3° C., a paint temperature of 23±3° C., and a relative humidity of 60±10%. The resulting clearcoat films were flashed off at booth temperature for 5 minutes. After that they were baked jointly with the aqueous basecoat films at 140±5° C. for 20 minutes.

TABLE

Composition and properties of clearcoat materials 1 to 6 (examples 1 to 6) and C1 and C2 (examples C1 and C2)

| Constituent | Clearcoat materials | | | | | | | |
|---|---|---|---|---|---|---|---|---|
| | 1 | 2 | 3 | 4 | 5 | 6 | C1 | C2 |
| (A)[a] | 19.83 | 19.93 | 19.76 | 20.93 | 20.93 | 20.93 | 20.08 | 19.59 |
| (B)[b] | 4.74 | 4.76 | 4.72 | 5 | 5 | 5 | 4.8 | 4.68 |
| (C)[c] | 3.55 | 3.57 | 3.54 | 3.75 | 3.75 | 3.75 | 3.6 | 3.51 |
| (D)[d] | 5.46 | 7.28 | 3.6 | 5.76 | 5.76 | 5.76 | 11.05 | — |
| (E)[e] | 5.45 | 3.66 | 7.22 | 5.77 | 5.77 | 5.77 | — | 10.81 |
| (F): | | | | | | | | |
| SCA[f] | 8.53 | 8.57 | 8.5 | 9 | 9 | 9 | 8.63 | 8.42 |
| Tin. 292[g] | 1.13 | 1.14 | 1.13 | 1.2 | 1.2 | 1.2 | 1.15 | 1.12 |
| Tin. 384[h] | 1.42 | 1.43 | 1.41 | 1.5 | 1.5 | 1.5 | 1.44 | 1.4 |
| Aero-sil[i] | 2.7 | 2.71 | 2.69 | 2.5 | 2.5 | 2.5 | 2.73 | 2.67 |
| Wet A[j] | 0.06 | 0.06 | 0.06 | 0.07 | 0.07 | 0.07 | 0.06 | 0.06 |
| Cat.[k] | 0.02 | 0.02 | 0.02 | 0.02 | 0.02 | 0.02 | 0.02 | 0.02 |
| Solids[l] % by wt) | 52.89 | 53.13 | 52.65 | 55.85 | 55.85 | 55.85 | 53.56 | 52.28 |
| (G)[m] | 47.13 | 46.89 | 47.37 | 44.71 | 44.71 | 44.71 | 46.46 | 47.74 |
| Resistance (k$\Omega$) | 780 | 660 | 960 | 980 | 760 | 920 | 470 | 1500 |

[a] Methacrylate copolymer (A), composed of the following copolymerized monomers (a1) and (a2): 18% by weight 2-ethylhexyl acrylate, 15% by weight n-butyl methacrylate, 30% by weight styrene, 36% by weight of 2-hydroxyethyl acrylate and 1% by weight acrylic acid; glass transition temperature 8.93° C., hydroxyl number 174 mg KOH/g; acid number 8.8 mg KOH/g;
[b] tris(butoxycarbonylamino)triazine (B);
[c] 3,5-dimethylpyrazole-blocked hexamethylenediisocyanate(C);
[d] water-soluble, reactive melamine-formaldehyde resin (D) (Cymel ® 327 from Cytec);
[e] water-insoluble, high-reactivity melamine-formaldehyde resin (E) (Luwipal ® 018 from BASF Aktiengesellschaft);
[f] SCA = Sag Control Agent; mixture of 55 parts by weight of a methacrylate copolymer formed from the following copolymerized monomers: 1.4% by weight methacrylate MA 13, 34.8% by weight n-butylacrylate, 40% by weight styrene, 21.6% by weight 2-hydroxyethyl acrylate and 2.2% by weight methacrylic acid; 4 parts by weight of the diurea of benzylamine and hexamethylene diisocyanate;
[g] Tin.292 = Tinuvin ® 292, light stabilizer of the HALS type from Ciba Specialty Chemicals;
[h] Tin.384 = Tinuvin ® 384, light stabilizer from Ciba Specialty Chemicals;
[i] Aerosil = Aerosil ®, pyrogenic silica from Degussa;
[j] Wet A = wetting agent Baysilon ® OL 44 from Bayer AG;
[k] cat. = commercially customary thermal crosslinking catalyst (amine-blocked p-toluene sulfonic acid; Cycat ® 4045)
[l] solids on application; processing flow time of the clearcoat material: 25 seconds according to DIN EN ISO 2431 (DIN ISO cup with 4 mm outlet nozzle);
[m] G = solvent mixture of butyl acetate 98/100, ethoxyethyl propionate, Solventnaphtha ®, isobutanol and n-butanol.

It was found that only clearcoat materials 1 to 6 could be applied without problems to give clearcoats with a dry film thickness of 45 μm which exhibited no surface defects such as runs or craters. Clearcoats 4 to 6 had the best leveling and the best overall visual appearance.

In contrast to clearcoats C1 and C2 clearcoats 1 to 6 showed no blushing in the condensation climate test according to DIN 50017.

Clearcoats 1 to 6, particularly clearcoats 4 to 6, were superior to clearcoats C1 and C2 in chemical resistance, particularly in their resistance toward battery acid.

Clearcoats 1 to 6 also showed a lower loss of gloss than clearcoats C1 and C2 following exposure to a laboratory carwash from Amtec Kistler (cf. T. Klimmasch, T. Engbert, Technologietage, Cologne, DFO, Report Volume 32, pages 59 to 66, 1997).

Overall, the multicoat color paint systems comprising clearcoats 1 to 6, particularly clearcoats 4 to 6, had the automobile quality required for application in the automotive sector.

What is claimed is:

1. A thermally curable one-component coating material having a solids content of from 40 to 80% by weight and an electrical resistance in the range from 600 to 1300 kΩ, comprising, based in each case on the coating material,
   (A) from 18 to 25% by weight, calculated as solids, of at least one (meth)acrylate (co)polymer with a hydroxyl number of from 80 to 240 mg KOH/g, an acid number of from 0 to 40 mg KOH/g, a number-average molecular weight of from 1500 to 20,000 daltons, a glass transition temperature of from −40 to +80°C., and a primary hydroxyl group content >50 equivalent %, based on the total amount of hydroxyl groups present in (A),
   (B) from 2 to 7% by weight, calculated as solids, of at least one tris(alkoxycarbonylamino)triazine,
   (C) from 2 to 8% by weight, calculated as solids, of at least one polyisocyanate blocked with at least one of pyrazole and substituted pyrazole,
   (D) from 3 to 9% by weight, calculated as solids, of at least one water-soluble, reactive melamine-formaldehyde resin having methylol groups wherein about 60 mol % or greater of the methylol groups are etherified and the resin having on average more than 0.5 imino groups in the molecule,
   (E) from 3 to 9% by weight, calculated as solids, of at least one water-insoluble, melamine-formaldehyde resin requiring no acid catalysts for thermal crosslinking,
   (F) from 0 to 40% by weight, calculated as solids, of at least one additive, and
   (G) from 20 to 60% by weight of at least one organic solvent.

2. The coating material as claimed in claim 1, wherein the electrical resistance is from 800 to 1200 kΩ.

3. The coating material as claimed in claim 2, wherein the solids content is from 50 to 60% by weight.

4. The coating material as claimed in claim 1, comprising the (meth)acrylate (co)polymer (A) in an amount of from 19 to 24% by weight, based on the coating material.

5. The coating material as claimed in claim 1, comprising the tris(alkoxycarbonylamino)triazine (B) in an amount of from 2 to 6% by weight, based on the coating material.

6. The coating material as claimed in claim 1, comprising the blocked polyisocyanate (C) in an amount of from 2 to 5% by weight, based on the coating material.

7. The coating material as claimed in claim 1, wherein the substituted pyrazole is selected from the group consisting of pyrazoles monosubstituted in position 3, pyrazoles disubstituted in 3,4 position, pyrazoles disubstituted in the 3,5 position, and pyrazoles trisubstituted in 3,4,5 position.

8. The coating material as claimed in claim 7, wherein the substituted pyrazole is selected from the group consisting of 3,4-disubstituted pyrazoles and 3,5-disubstituted pyrazoles.

9. The coating material as claimed in claim 8, wherein the substituted pyrazole is selected from the group consisting of 3,4-dimethylpyrazole and 3,5-dimethylpyrazole.

10. The coating material as claimed in claim 9, wherein the pyrazole is 3,5-dimethylpyrazole.

11. The coating material as claimed in claim 1, comprising the reactive melamine-formaldehyde resin (D) in an amount of 3 to 8% by weight, based on the coating material.

12. The coating material as claimed in claim 11, wherein the reactive melamine-formaldehyde resin (D) is catalyzed with at least one of weak organic acids and inorganic acids, said acids having a $pK_a>4$, in particular>5.

13. The coating material as claimed in claim 1, wherein the degree of alkylation of the reactive melamine-formaldehyde resin (D) is up to 60 equivalent % of the methylol groups present in (D) and the degree of alkylation of the reactive melamine-formaldehyde resin (D) is on average at least 70, equivalent % of the methylol groups present in (D).

14. The coating material as claimed in claim 1, wherein the reactive melamine-formaldehyde resin (D) is alkylated with alkyl groups selected from the group consisting of methyl, propyl, isopropyl, n-butyl, and isobutyl groups.

15. The coating material as claimed in claim 1, comprising the high-reactivity melamine- formaldehyde resin (L) in an amount of from 3 to 8% by weight based on the coating material.

16. The coating material as claimed in claim 1, wherein the high-reactivity melamine-formaldehyde resin (L) is alkylated with butyl groups.

17. The coating material as claimed in claim 1, containing from 5 to 30% by weight, based on the coating material, of at least one additive selected from the group consisting of thermally curable reactive diluents; molecularly dispersely soluble dyes; light stabilizers; antioxidants; wetting agents; emulsifiers; anticrater additives; slip additives; thermal crosslinking catalysts; thermolabile free-radical initiators; adhesion promoters; leveling agents; film-forming auxiliaries; rheological assistants; flame retardants; waxes; biocides and flatting agents, organic and inorganic, transparent pigments, fillers and nanoparticles.

18. The coating material as claimed in claim 17, wherein the additive is selected from the group consisting of light stabilizers, wetting agents, anticrater additives, rheological assistants and transparent inorganic nanoparticles and mixtures thereof.

19. The coating material as claimed in claim 1, containing the solvent in an amount of from 30 to 55% by weight, based on the coating material.

20. The coating material as claimed in claim 1, containing the solvent in an amount of from 40 to 50% by weight, based on the coating material.

21. A process for preparing thermally curable one-component coating materials as claimed in claim 1, which comprises mixing constituents (A) to (G) with one another and homogenizing the resulting mixture.

22. A clearccoat coating composition comprising the thermally curable one-component materials as claimed in claim 1.

* * * * *